(12) United States Patent
Kang et al.

(10) Patent No.: US 11,579,801 B2
(45) Date of Patent: Feb. 14, 2023

(54) WRITE ORDERING IN SSDS

(71) Applicant: Samsung Electronics Co., Ltd., Suwon-si (KR)

(72) Inventors: Yangwook Kang, San Jose, CA (US); Pratik Mishra, San Jose, CA (US); Yang Seok Ki, Palo Alto, CA (US); Jason Martineau, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/897,173

(22) Filed: Jun. 9, 2020

(65) Prior Publication Data
US 2021/0382654 A1 Dec. 9, 2021

(51) Int. Cl.
*G06F 3/06* (2006.01)
*G06F 9/54* (2006.01)

(52) U.S. Cl.
CPC .......... *G06F 3/0659* (2013.01); *G06F 3/0613* (2013.01); *G06F 3/0653* (2013.01); *G06F 3/0656* (2013.01); *G06F 3/0673* (2013.01); *G06F 9/542* (2013.01)

(58) Field of Classification Search
CPC ............. G06F 3/06–0689; G06F 9/542; G06F 3/0659; G06F 3/0613; G06F 3/0653; G06F 3/0656; G06F 3/0673
See application file for complete search history.

(56) References Cited

U.S. PATENT DOCUMENTS

| 8,898,388 | B1 | 11/2014 | Kimmel |
|---|---|---|---|
| 10,452,279 | B1 | 10/2019 | Malwankar et al. |
| 2003/0135729 | A1 | 7/2003 | Mason, Jr. et al. |
| 2006/0015652 | A1 | 1/2006 | Day et al. |
| 2007/0208820 | A1* | 9/2007 | Makhervaks ........... H04L 67/10 709/212 |
| 2010/0262721 | A1 | 10/2010 | Asnaashar et al. |
| 2012/0047518 | A1 | 2/2012 | Parkinson et al. |

(Continued)

FOREIGN PATENT DOCUMENTS

EP    2863316 A1    4/2015

OTHER PUBLICATIONS

Arragattu, Prashanth Kumar. ISCSI performance for mobile appliances using intermediate target storage. Diss. Wichita State University, 2009. (Year: 2009).*

(Continued)

*Primary Examiner* — Nicholas J Simonetti
(74) *Attorney, Agent, or Firm* — Lewis Roca Rothgerber Christie LLP

(57) ABSTRACT

Disclosed are systems and methods by which a storage device may process and return I/O commands to a host in the order in which the host provided the commands, thereby reducing host overhead, including but not limited to the following: receiving a first I/O command and a second I/O command, the first I/O command and the second I/O command being assigned a sequence tag, issuing the first I/O command and the second I/O command to one or more storage channels based on their respective sequence tags, collecting a command completion notice of the first I/O command or the second I/O command when the first I/O command or the second I/O command has been respectively completed; and issuing a command completion notification to a host based on the sequence tag of the associated completed first I/O command or the second I/O command.

18 Claims, 7 Drawing Sheets

(56) References Cited

U.S. PATENT DOCUMENTS

| | | | |
|---|---|---|---|
| 2014/0156921 A1 | 6/2014 | Schuette et al. | |
| 2015/0378605 A1* | 12/2015 | Huang | G06F 3/0688 |
| | | | 711/103 |
| 2016/0132251 A1* | 5/2016 | Hwang | G06F 3/0679 |
| | | | 711/154 |
| 2016/0266807 A1 | 9/2016 | Amidi et al. | |
| 2018/0157419 A1* | 6/2018 | Ki | G06F 3/0659 |
| 2019/0205244 A1 | 7/2019 | Smith | |
| 2019/0278515 A1* | 9/2019 | Wells | G06F 3/064 |
| 2019/0392047 A1 | 12/2019 | Sorenson, III | |
| 2020/0004455 A1 | 1/2020 | Williams et al. | |
| 2020/0366626 A1* | 11/2020 | Tong | H04L 45/026 |

* cited by examiner

WRITE ORDERING IN SSDS

TECHNICAL FIELD

Aspects of the present disclosure relates to methods and systems for in-order I/O command management between a host system and a storage device.

BACKGROUND

The following background is intended solely to provide information necessary to understand the context of the inventive ideas and concepts disclosed herein. Thus, this background section may contain patentable subject matter and should not be regarded as a disclosure of prior art.

From the perspective of a storage device, there is generally no guarantee that a given I/O command will be performed before any other given I/O command—there are a variety of reasons for this, but three important ones of note are first, that I/O commands may be of differing size and complexity (e.g., a small write is generally faster than a large write, and for some media, reads are considerably faster than writes), second, that there are multiple internal channels for processing commands, each associated with storage media in the storage device, and each channel has a processing queue independent of the host's processing queues (e.g., multiple channels to multiple NAND flash chips—each individual channel servicing specific physical addresses), and third, some storage devices have background operations which may occupy one or more internal processing channels at uncontrollable intervals (e.g., garbage collection in NAND flash).

When utilizing a storage system, write coherency and consistency may be essential properties that should be maintained. For example, when a computer system requests that a datum first be written, then later read, in that order, the computer system should ensure that the commands are in fact processed in that order. Otherwise, if the read command were to be executed before the write command, the read command would return incorrect (old) data. As a further example, if an older write request were processed after a newer write request, an illegal-overwrite would occur, and the data recorded on the device would be incorrect. This managerial problem is amplified if multiple applications are allowed to access the same datum, and if there are multiple queues by which the host can issue I/O commands.

Thus, there is a desire for mechanisms to enhance the ability of storage devices to manage write scheduling.

SUMMARY

Aspects of embodiments of the concepts of the present disclosure relate to systems and methods by which a computing system, and more specifically, a storage device, may perform I/O command processing and notification in order with minimal effort by a host. Some embodiments may comprise and use a sequence tag generator logic to provide sequence tags to I/O commands. Some embodiments may comprise a command handler logic to initiate the processing of I/O commands in an order dependent upon their sequence tags. Some embodiments may comprise a notification logic that is configured to coalesce I/O command notifications and return them to a host in the order of their sequence tags.

According to one example embodiment, provided is a method for processing IO requests in order by a storage device, the method comprising: receiving a first I/O command and a second I/O command, the first I/O command and the second I/O command being assigned a sequence tag, issuing the first I/O command and the second I/O command to one or more storage channels based on their respective sequence tags, collecting a command completion notice of the first I/O command or the second I/O command when the first I/O command or the second I/O command has been respectively completed; and issuing a command completion notification to a host based on the sequence tag of the associated completed first I/O command or the second I/O command.

According to another example embodiment, provided is a storage device comprising: at least two command queues, a command handler logic, at least two physical channels, each physical channel being associated with one or more solid-state storage media, the respective storage media being associated with respective physical addresses, at least two physical channel queues, associated with respective ones of the at least two storage channels, and a notification manager logic. The at least two command queues are configured to receive I/O commands from a host, the I/O commands being associated with sequence tags. The command handler logic is configured to issue I/O commands from the at least two command queues to the at least two physical channel queues, based on the physical addresses associated with the I/O commands and the sequence tags of the commands. The notification logic is configured to issue I/O command completion notices to the host based on the sequence tags of respective completed I/O commands.

According to another example embodiment, provided is A system comprising: a host computer system, and a storage device communicatively coupled to the host computer system. The storage device comprises: at least two command queues, a command handler logic, at least two storage channels, each channel associated with one or more solid-state storage media, the respective storage media being associated with respective storage addresses, at least two storage channel queues, associated with respective ones of the at least two storage channels, and a notification manager logic. The at least two command queues are configured to receive I/O commands from the host computer system, the I/O commands being associated with sequence tags. The command handler logic is configured to issue I/O commands from the at least two command queues to the at least two storage channel queues, based on storage addresses associated with the I/O commands and the sequence tags of the commands. The notification logic is configured to issue command completion notices to the host based on the sequence tags of respective completed I/O commands.

BRIEF DESCRIPTION OF THE DRAWINGS

These and other features and aspects of the present disclosure will be appreciated and understood with reference to the specification, claims, and appended drawings wherein:

DETAILED DESCRIPTION

Figure 1:
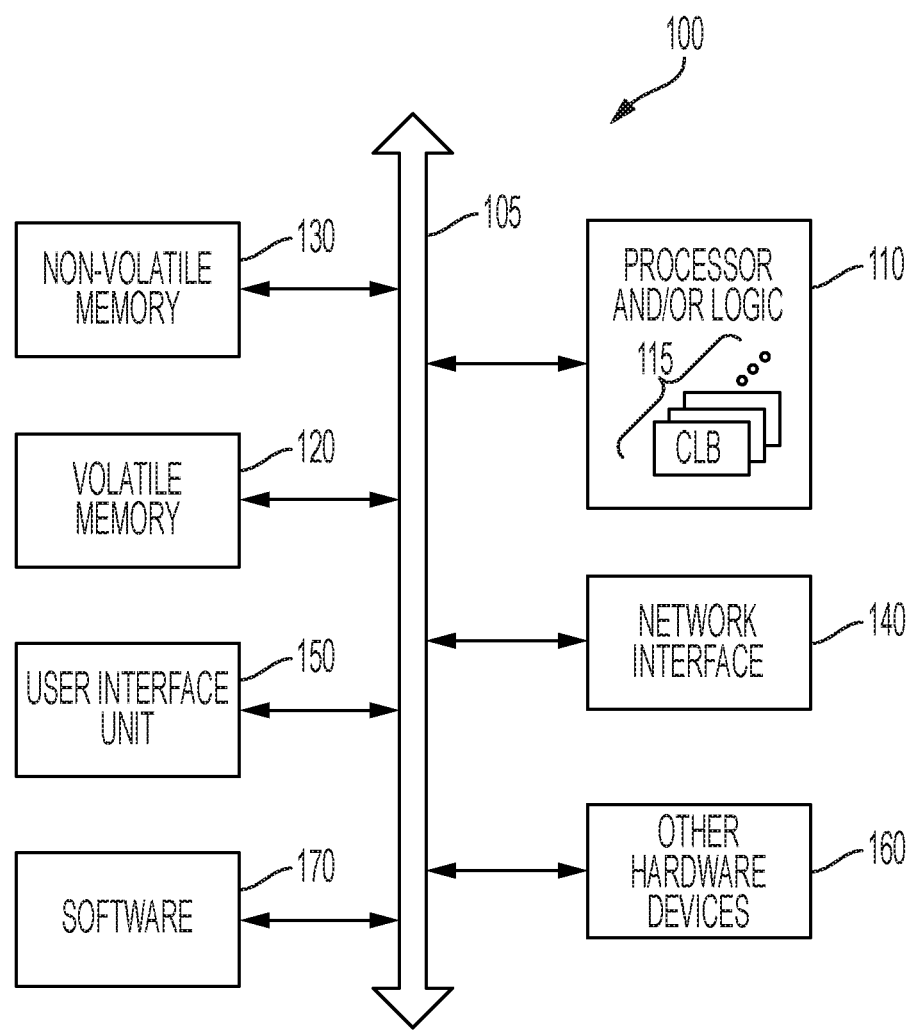
FIG. 1 is a schematic block diagram of an information processing system that may comprise devices formed according to an example embodiment of the present invention.

Various example embodiments will be described more fully hereinafter with reference to the accompanying drawings, in which some example embodiments are shown. The present disclosed subject matter may, however, be embodied in many different forms and should not be construed as being limited to the example embodiments set forth herein. Rather, these example embodiments are provided so that this disclosure will be thorough and complete, and will fully convey the scope of the presently disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. When an element is referred to as being "directly on", "directly connected to" or "directly coupled to" another element or layer, there are no intervening elements or layers present. Like numerals refer to like elements throughout. As used herein, the term "and/or" comprises any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to comprise deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a schematic block diagram of an information processing system 100, which may comprise semiconductor devices formed according to principles of the disclosed subject matter.

Referring to FIG. 1, an information processing system 100 may comprise one or more of devices constructed according to the principles of the disclosed subject matter. In one or more other embodiments, the information processing system 100 may employ or execute one or more techniques according to the principles of the disclosed subject matter.

In various embodiments, the information processing system 100 may comprise a computing device, such as, for example, a laptop, desktop, workstation, server, blade server, personal digital assistant, smartphone, tablet, and other appropriate computers or a virtual machine or virtual computing device thereof. In various embodiments, the information processing system 100 may be used by a user.

The information processing system 100 according to the disclosed subject matter may further comprise a central processing unit (CPU), logic, or processor 110. In some embodiments, the processor 110 may comprise one or more functional unit blocks (FUBs) or combinational logic blocks (CLBs) 115. In such an embodiment, a combinational logic block may comprise various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may comprise asynchronous operations, or a mixture thereof. In one embodiment, the combinational logic operations may comprise a plurality of complementary metal oxide semiconductor (CMOS) transistors. In various embodiments, these CMOS transistors may be arranged into gates that perform logical operations, although it is understood that other technologies may be used and are within the scope of the disclosed subject matter.

The information processing system 100 according to the disclosed subject matter may further comprise a volatile memory 120 (e.g., a Random Access Memory (RAM)). The information processing system 100 according to the disclosed subject matter may further comprise a non-volatile memory 130 (e.g., a hard drive, an optical memory, a NAND or flash memory, and/or other solid state memories). In some embodiments, either the volatile memory 120, the non-volatile memory 130, or a combination or portions thereof may be referred to as a "storage medium". In various embodiments, the volatile memory 120 and/or the non-volatile memory 130 may be configured to store data in a semi-permanent or substantially permanent form.

In various embodiments, the information processing system 100 may comprise one or more network interfaces 140 configured to allow the information processing system 100 to be part of and communicate via a communications network via a wired and/or wireless and/or cellular protocol. Examples of a wireless protocol may comprise, but are not limited to, Institute of Electrical and Electronics Engineers (IEEE) 802.11g, IEEE 802.11n. Examples of a cellular protocol may comprise, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may comprise, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited. As a result of being connected to an network via the network interfaces 140, the information processing system 100 may have access to other resources, for example, external volatile memories, non-volatile memories, processors/logic, and software, whether as stand-alone network resources or as components of an external additional system.

The information processing system 100 according to the disclosed subject matter may further comprise a user interface unit 150 (e.g., a display adapter, a haptic interface, and/or a human interface device). In various embodiments, this user interface unit 150 may be configured to either receive input from a user and/or provide output to a user. Other kinds of devices may be used to provide for interaction with a user as well; for example, feedback provided to the user may be any form of sensory feedback, e.g., visual feedback, auditory feedback, and/or tactile feedback; and input from the user may be received in any form, including acoustic, speech, and/or tactile input.

In various embodiments, the information processing system 100 may comprise one or more other devices or hardware components 160 (e.g., a display or monitor, a keyboard, a mouse, a camera, a fingerprint reader, and/or a video processor). It is understood that the above are merely a few illustrative examples to which the disclosed subject matter is not limited.

The information processing system 100 according to the disclosed subject matter may further comprise one or more system buses 105. In such an embodiment, the system bus 105 may be configured to communicatively couple the processor 110, the volatile memory 120, the non-volatile memory 130, the network interface 140, the user interface unit 150, and one or more hardware components 160. Data processed by the processor 110 or data inputted from outside of the non-volatile memory 130 may be stored in either the non-volatile memory 130 or the volatile memory 120.

In various embodiments, the information processing system 100 may comprise or execute one or more software components 170. In some embodiments, the software components 170 may comprise an operating system (OS) and/or an application. In some embodiments, the OS may be configured to provide one or more services to an application and manage or act as an intermediary between the application and the various hardware components (e.g., the processor 110 and/or a network interface 140) of the information processing system 100. In such an embodiment, the information processing system 100 may comprise one or more native applications, which may be installed locally (e.g., within the non-volatile memory 130) and configured to be executed directly by the processor 110 and directly interact with the OS. In such an embodiment, the native applications may comprise pre-compiled machine executable code. In some embodiments, the native applications may comprise a script interpreter (e.g., C shell (csh), AppleScript, AutoHotkey) and/or a virtual execution machine (VM) (e.g., the Java Virtual Machine, the Microsoft Common Language Runtime) that are configured to translate source or object code into executable code which is then executed by the processor 110.

As discussed herein, devices may comprise logics configured to perform various tasks. The logics may be embodied as hardware, software, or a combination thereof. When a logic comprises hardware, the hardware may be in the form of specialized circuit arrangements (e.g., ASICS), programmable arrays of gate logics and memories (e.g., FPGAs), or specially programmed general purpose logic (e.g., CPUs and GPUs). When the logic comprises software, the software may be configured to operate specialized circuits, or to program arrays of circuits, memories, or operate general purpose processors. Logic embodied in software may be stored on any available storage medium, such as DRAM, flash, EEPROM, Resistive memories, and/or the like.

Figure 2:
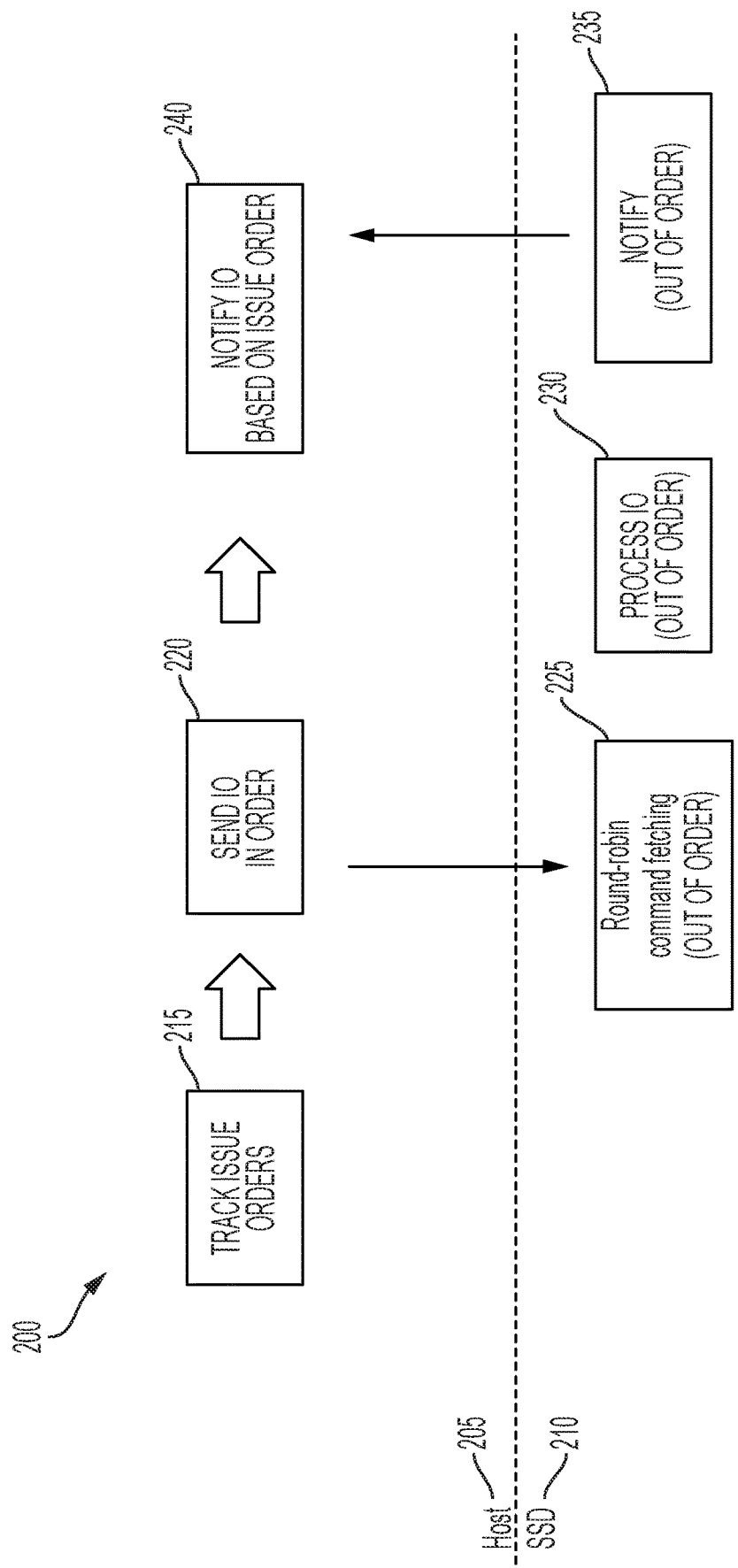
FIG. 2 is an example flow chart depicting an I/O command processing technique for a computer system.
Figure 3:
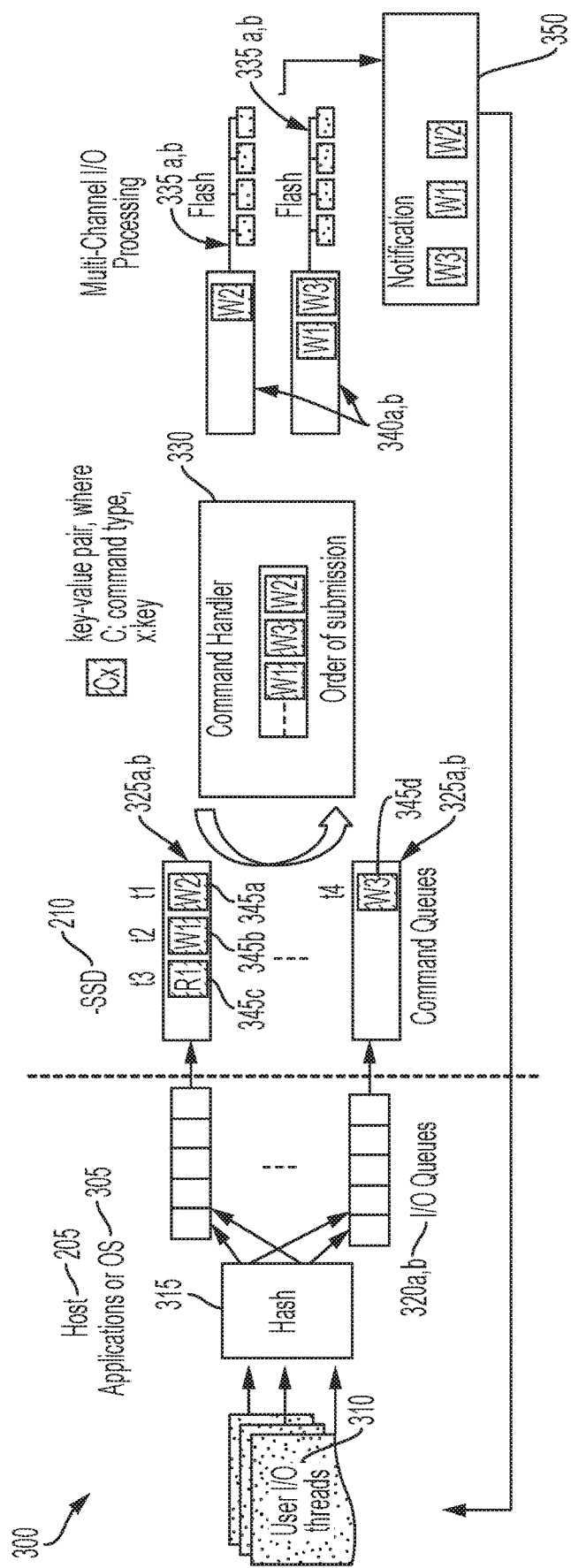
FIG. 3 is an example block diagram of a computing system for processing I/O commands.

FIG. 2 illustrates an embodiment of a mechanism for a Host 205 to communicate with a solid state drive (SSD) 210 to coordinate the processing of I/O commands. FIG. 3 illustrates a block diagram of an embodiment of the Host 205 and the SSD 210 capable of performing the method described in FIG. 2. In some embodiments, the Host 205 may be similar to computing system 100 of FIG. 1. The SSD 210 may function as the volatile memory 120 or the non-volatile memory 130, or as a resource available over the network interface 140 of FIG. 1. The I/O commands may be any sort of I/O commands, including key-value based commands, logical block address (LBA) based commands, and/or others.

Turning now to FIGS. 2-3, according to an example mechanism, the Host 205 is responsible for tracking I/O commands issued by the operating system or various applications 305, running on the Host 205 as threads 310. As disclosed more thoroughly below, the Host 205 is responsible for preventing I/O errors caused by the possible out-of-order processing of commands by the SSD 210. Such errors comprise, but are not limited to: illegal over-writes (where older data over-writes newer data), reading stale data (where a read is issued after a write, but is processed before the write), and out-of-order notifications to applications (where an application is informed of a sequence of actions that is out of the order of actions that actually occurred, leading the application to believe that an error has occurred when it has not, or to not believe an error has occurred when it has). As described more thoroughly below, the host may do this by, amongst other things, issuing locks on SSD resources (e.g., locking queues), and delaying the issuance of dependent commands (e.g., a read that follows, and therefore depends on, an earlier write) until the host has received a completion notice of the command upon which it depends.

At process 215, the Host 205 prepares to issue I/O commands (which ultimately mature as commands 345*a-d*), such as I/O commands issued by the OS or any applications 305 using the Host 205, and tracks the order in which the I/O commands were issued, and the identity of the applications issuing the I/O commands. During process 215, the I/O commands (along with an indication of receipt order and issuing application) may be staged in a memory, such as the volatile memory 120 of FIG. 1, for processing.

At process 220, the I/O commands are sent, in order, to an SSD. The act of sending may be through placing I/O commands into one or more Host-side I/O submission queues 320, which may be read into, and associated with command queues 325 on the SSD 210. The I/O commands may be placed in a plurality of I/O submission queues 320*a-b*; two queues are shown, but any number greater than two are also possible. The I/O commands may be placed in the I/O queues 320*a-b* by various mechanisms, including by association of a particular queue with a processor core/threads 310, association of a particular queue with an application/OS 305, and/or via a hashing logic 315 (such as by hashing a key of a key-value pair to determine an I/O queue 320). The act of sending an I/O command in order may involve waiting until the I/O command upon which the sent I/O command depends is completed, or until a lock on resources is released.

At process 225, the SSD 210 receives and buffers the I/O commands, shown as I/O commands 345*a-d*. Four commands are illustrated, but any suitable number are possible as those of ordinary skill in the art would appreciate. I/O commands 345*a-d* are shown with respective time markers (t1-t4), but this is for conceptual illustration purposes- and is not meant to be a process of the system. The commands are also marked with labels W2, W1, R1, and W3, respectively, to indicate the nature of the command (Read or Write) and the address they are associated with. This marking is merely descriptive of the example commands 345*a-d*, and is not meant to indicate a process of the system. The commands 345*a-d* may be buffered or stored internally to the SSD 210 in one or more command queues 325*a-b*, which may correspond to a respective set of I/O submission queues 320*a-b* on the host 205. As with the host, 2 queues are shown, but more are also possible. The command queues 325*a-b* may have their I/O commands 345*a-d* fetched for processing by a command handler logic 330 (e.g., for actual retrieval from the solid state memory) in the storage device in a round robin manner. This command handler logic 330 may be embodied in a storage devices controller circuitry (not shown). This round-robin processing prevents or substantially prevents any given queue (and associated application) from monopolizing the SSD 210.

At process 230, commands 340*a-d* that were fetched from the SSD's command queues 325*a-b* may be issued, by the command handler logic 330, to a plurality of the SSD 210's memory device channel queues 340*a-b* for actual performance by the flash memory chips located on channels 335*a-b* (flash memory being one example of many possible solid state storage memories that one or more embodiments may use).

By way of example, in some embodiments, within the SSD 210, physical solid state memories (e.g., flash memory chips) are placed into multiple parallel physical channels on an SSD, in order to allow for parallel processing of I/O commands. This is illustrated with the flash chips occupying physical channels (e.g., physical channels or flash channels) 335*a,b* (two channels 335*a-b* with four chips shown, but more channels and differing numbers of chips are possible). When I/O commands such as 345*a-b* are sent to physical memory for processing, they may be placed into a set of memory device channel queues 340*a-b*, associated with respective physical channels 335*a,b*. I/O commands may be sent to one or more specific memory device channel queues 340*a-b* based on the physical address(es) associated with each I/O command. By way of example, when an I/O command such as one of 345*a-d* is to be processed, the command handler logic 330 may determine physical addresses associated with the command, determine one or more memory device channel queues 340*a-b* housing memory (such as flash chips on the channels 335*a-b*) containing the physical addresses, and place the I/O command in the channel queues 340*a-b* that are associated with the memories having those addresses.

In the example of FIG. 3, it should be noted that the physical processing of the commands 345*a-d* may be done out of order due to the combination of round-robin command queue fetching by command handler logic 330, combined with physical address determined placement in the channel queues 340*a-b*. For example, it should be noted that the channel queue 340*a* receives command 345*a* (t1, W2), and the channel queue 340*b* receives commands 345*b* (t2, W1) and 345*d* (t4, W3), with command 345*d* ahead of command 345*b*, due to the round robin fetching. Thus, the commands 345*a* and 345*d* are at the head of their respective channel queues 340*a-b*. Therefore, it is quite possible (especially if command 345*d* is a "small" write command), for command 345*d* to be completed before command 345*a*. This out of order processing may be exacerbated by certain background operations required of the solid state memory. For example, if garbage collection must be performed on a flash chip in the channel 335*a*, then the entirety of the channel 335*a*, and the associated channel queue 340*a* (and possibly other channels) may be unavailable for processing commands—whereas other channels not occupied with garbage collection are free to process their respective queues 340.

Returning now to FIGS. 2-3, at process 235, the SSD 210, via notification logic 350 notifies the Host 205 of completed I/O commands 345*a-d* in the order in which the SSD completes them (that is, potentially out of order, as described above). In the illustrated embodiment, the order of notifications would be 345*d*, then 345 *a*, then 345*b* (with 345*c* still not completed). The notification logic 350 may be comprised within a storage controller (not shown) of the SSD 210.

At process 225, the Host 205 receives the I/O completion notifications send from the SSD 210 in the order in which the SSD sends them (that is, potentially out of order). For example, as illustrated in FIG. 3, the order of command completion notification is 345d, 345a, then 345b, with command 345c yet to be processed. The host may then accumulate the completion notifications necessary to confirm that no timing/consistency errors have occurred, destages the I/O command requests, and sends the I/O completion notifications to the application/OS 305 in the order that the application/OS 305 requested them in (that is, in order: 345a, 345b, and awaiting 345c before notifying on 345d). Locks on resources may be released. If potential consistency errors are detected, then the I/O requests may be repeated rather than destaged, and the Application/OS 305 is not informed of the completion notifications.

As may be observed from examining FIGS. 2-3, and their associated discussion, the mechanism described above may generally avoid the most serious forms of consistency errors-since a series of I/O commands from a given application to a given address will be restricted to a single host-side I/O queue 320, a single SSD command queue 325, and pre-determined set of channel queues 340. Further, inter-application consistency errors may be reduced via the locking of one or more queues. Still, this mechanism requires substantial resource utilization from the host, and invokes inefficiencies within the SSD. Specifically, the host must stage and destage all I/O requests according to the order in which they were received, and must track completion notifications sufficient to ensure that no consistency errors have occurred. Further, the locking of a queue reduces the overall number of I/Os that may be processed by the queue in a given time, and the round-robin issuance of I/O commands 345a-d from command queues 325a-b to channel queues 340 may leave one or more of such queues being underutilized.

Figure 4:
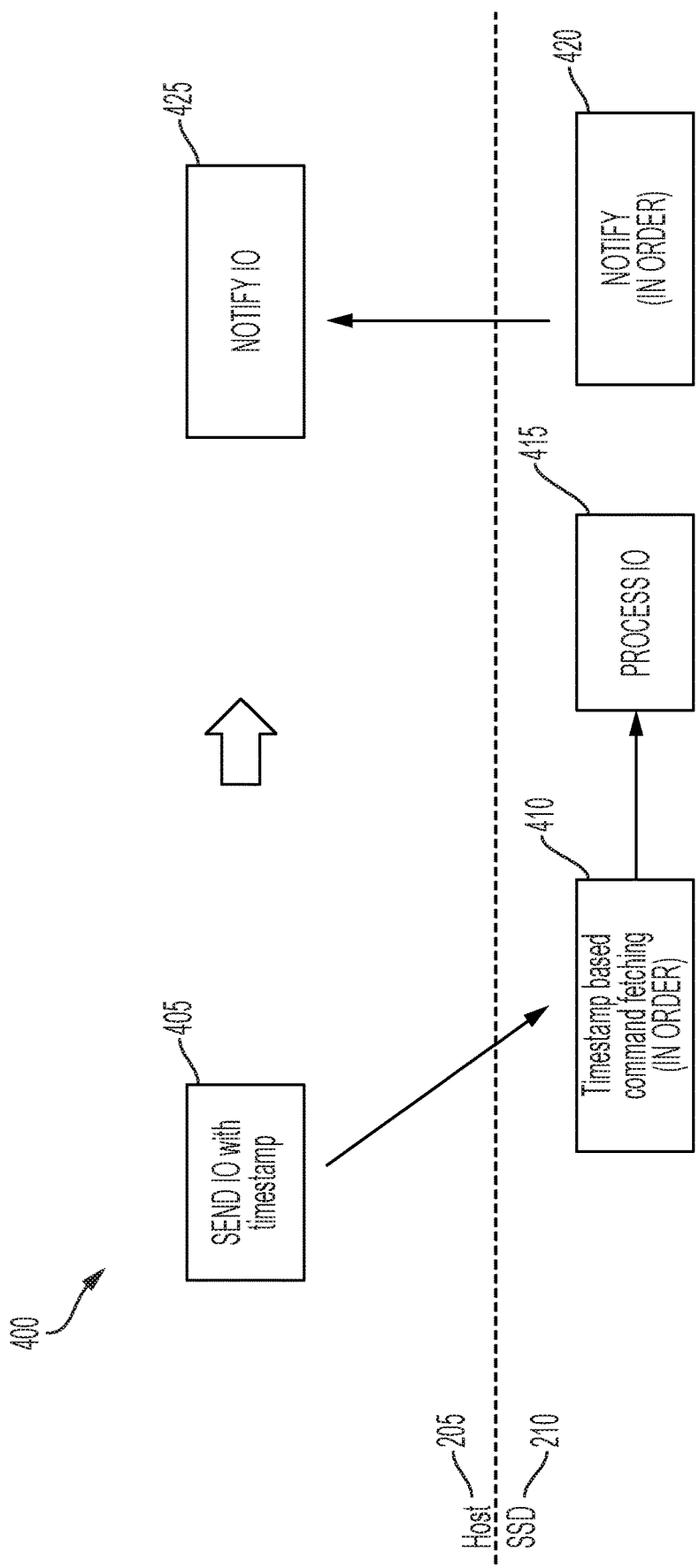
FIG. 4 is an example flow chart depicting an I/O command processing technique for a computer system used to process I/O commands in order, according to an example embodiment of the present invention.
Figure 5:
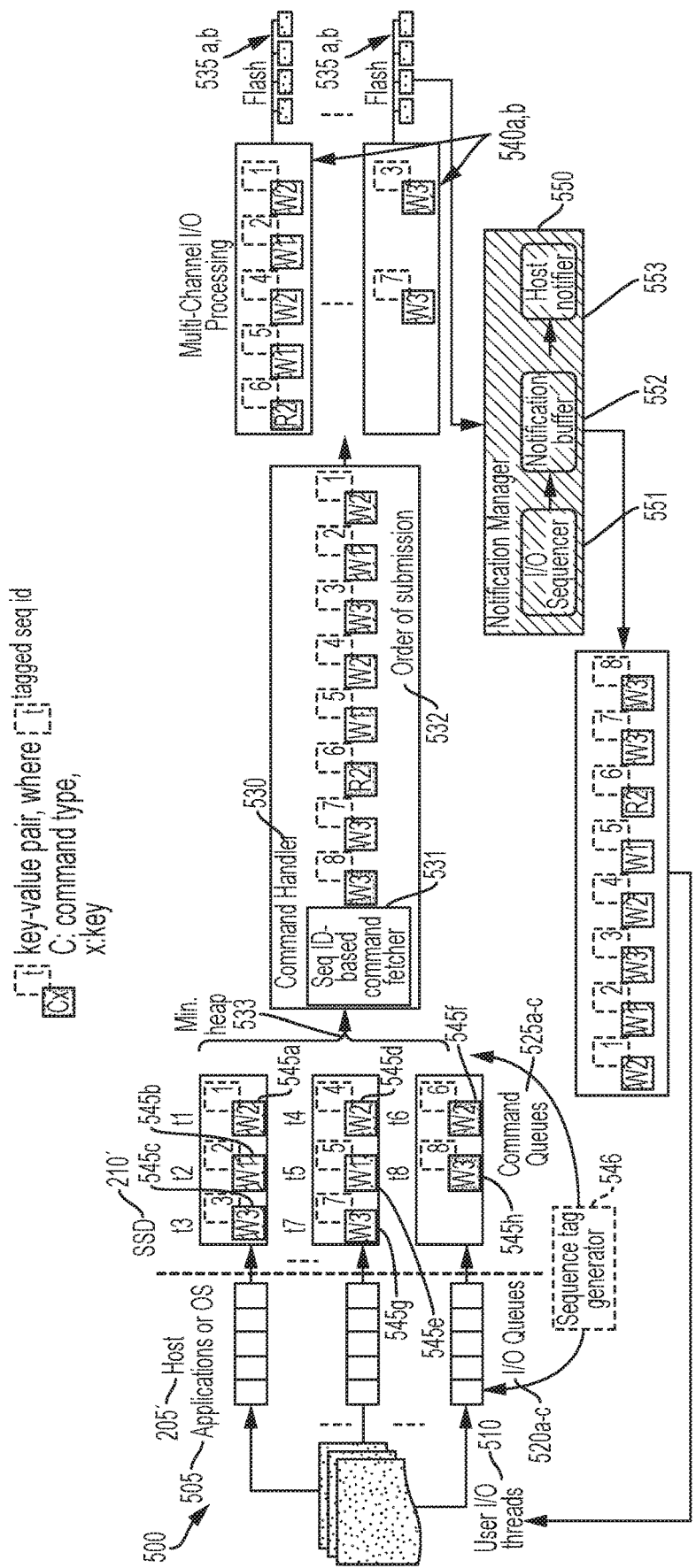
FIG. 5 is an example block diagram of a computing system for processing I/O commands in order, according to an example embodiment of the present invention.

FIG. 4 illustrates an embodiment of a mechanism for a Host 205' to communicate with a solid state drive (SSD) 210' to coordinate the processing of I/O commands with reduced host overhead. FIG. 5 illustrates a block diagram of an embodiment of the Host 205' and the SSD 210' capable of performing the method described in FIG. 4. In some embodiments, the Host 205' may be similar to the computing system 100 of FIG. 1. In some embodiments, the SSD 210' may function as the volatile memory 120 or the non-volatile memory 130 of FIG. 1, or as a resource available over the network interface 140. The I/O commands may be any sort of I/O commands, including key-value based commands, logical block address (LBA) based commands, or others.

As will be shown further below, the example embodiments illustrated in FIGS. 4-5 are structured to allow the SSD 210' to perform receive I/O commands from the Host 205' in a defined order, and notify the Host 205' of command completions in that same order. This allows the Host 205' to forego much of the host-side I/O management discussed above with regard to FIGS. 3-4, and allows the SSD 210' to more efficiently use its own internal resources.

Turning to FIGS. 4-5, at process 405, the Host 205' sends I/O commands to the SSD 210' in the order that they are generated by an application/OS 505. The act of sending may be through one or more host-side I/O submission queues 520a-c, which may be read into, and associated with command queues 525a-c on the SSD 210'. The I/O commands may be placed in a plurality of I/O submission queues 520a-c; three queues are shown, but any number greater than two are possible. The I/O requests may be placed in the I/O submission queues 520a-c directly by association of a particular queue with a processor core/threads 510, and/or association of a particular queue with an application/OS 505. As a result of the sending of process 405, commands 545a-h are placed in the command queues 525a-c of the SSD 210'.

As will be made more readily apparent below, in this embodiment, the Host 205' may simply queue I/O commands directly with minimal processing, and need not stage I/O requests (including tracking the issuing sequence and identify of an issuer), lock resources, de-stage the I/O requests upon completion, or monitor the order and/or consistency of I/O completion notifications-thereby freeing up host resources.

In some embodiments, at process 405, each I/O command is associated with a timestamp or other sequential number (such as an ordinal integer) that is determined by the order in which each I/O command is sent, which may be called a sequence tag. The timestamp or sequential number (sequential tag) may be generated by a sequence tag generator logic 546. The sequence tag generator logic 546 may be located on either the Host 205' or the SSD 210'. In embodiments where the Host 205' comprises the sequence tag generator logic 546, the sequence tag is sent along with the I/O command to the SSD 210'. In embodiments where the Host 205' comprises the sequence tag generator logic 546, the sequence tag generator may be used to ensure that, if an I/O command may be decomposed into a set of logical block address (LBA) directed operations, that all of the decomposed commands utilize consecutive sequence tags. In embodiments where the SSD 210' comprises the sequence tag generator logic 546, I/O commands need not be sent from the Host 205' with sequence tags; sequence tags are added to the I/O commands when they are received by the SSD 210'. The sequence tags are illustrated on commands 545a-h as tags t1 through t8. In various embodiments where the sequence tag generator logic 546 is located on the SSD 210', the sequence tag generator logic 546 may be in communication with the index logic, the command handler logic, and/or the command queues, depending in part on where the sequence tag (and/or its association with am I/O command) is stored.

Turning now to FIG. 5, it should be noted that I/O commands 545a-h are associated with respective sequence tags t1-t8. It should also be noted that the commands have been placed in the command queues 525a-c associated with respective I/O command submission queues 520a-c, which in turn are associated with user/OS I/O threads 510. It should further be noted that within each queue, the I/O commands 545a-h are in temporal order, but across queues, there is no specific order. It should also be noted that each I/O command 545a-h is illustrated with an example operation type (read or write) and address (EG 1-3). This is for purposes of illustrating the effects of the embodiments, and is not reflective of any action of the embodiments.

Further with regard to FIG. 5, the SSD 210' comprises an indexing logic 533. The indexing logic 533 indexes all I/O commands 545a-h in the command queues 525a-c in sequence tag order, and may be the mechanism by which sequence tags are associated with specific I/O commands 545a-h. The indexing logic 533 may comprise a min-heap index, however, many other indexes would also suffice. In some embodiments, indexing logic 533 may also track the activities of the physical memory channels 535a-b and their associated queues 540a,b, as will be discussed below, however, in other embodiments, other logics may track these activities (also discussed below). The SSD 210' also comprises a command handler logic 530. The indexing logic 533 may additionally comprise, or be in communication with, an index memory for housing the index (not shown). The indexing logic 533 may also be in communication with the sequence tag generator logic 546, the command handler logic 530, and/or the command queues 525a-c.

Returning now to FIGS. 4-5, at process 410, the command handler logic 530 fetches I/O commands 545a-h from the command queues 525a-c in sequence tag order, determines the physical block addresses associated with each specific I/O command 545a-h, and places (in fetching order) each specific I/O command 545a-h into one or more physical channel queues 540a-b associated with respective physical storage channels (i.e., physical channels) 535a,b, each in turn including the solid state memory chips associated with the determined physical addresses.

By way of example, in some embodiments, within the SSD 210', physical solid state memories (e.g., flash memory chips) are placed into multiple parallel physical channels on an SSD, in order to allow for parallel processing of I/O commands. This is illustrated with the flash chips occupying the physical channels 535a,b (two channels 535a-b, with four chips are shown, but more channels and differing numbers of chips are possible). When I/O commands such as 545a-h are sent to physical memory for processing, they may be placed into a set of memory device physical channel queues 540a-b. I/O commands may be sent to one or more specific memory device physical channel queues 540a-b based on the physical address(es) associated with each I/O command. By way of example, when an I/O command such as one of 545a-d is to be processed, the command handler logic 530 may determine physical addresses associated with the command, determine one or more memory device channel queues 540a-b housing memory (such as flash chips on the physical channels 535a-b) containing the physical addresses, and place the I/O command in the channel queues 540a-b that are associated with the memories having those addresses.

The command handler logic 530 may utilize the indexing logic 533 to ensure that it processes commands from the I/O command queues 525a-c into the physical channel queues 540a,b in tag sequence order. Upon issuing a specific I/O command 545a-h to the channel queues 540a,b, the I/O command is removed from the index 533 and from the command queues 525a-c. When an I/O command is placed within the channel queues 540a,b, it may be indexed by an index (not shown) in the I/O sequencer logic 551 of a notification manager logic 550, as will be discussed further below.

With regards to FIG. 5, it should be noted that because the command handler logic 530 has sent I/O commands 545a-h to the physical channel queues 540a,b in order, this results in each of the individual channel queues 540a,b having all commands listed therein in-order. This may prevent any data-consistency errors: all operations on a given physical address will be processed in order, so there is no possibility (or substantially no possibility) of write-after-read errors, or old-write-after-new-write errors, etc. The following non-illustrated circumstance should further be noted: if a command comprises operations on an address range that spans multiple channels (for example, a write to a very large key-value, or a command whose LBA range may be translated to disparate physical addresses), then that command would be dispatched to multiple channels concurrently (e.g., simultaneously) and in the order it was given, maintaining consistency even for data items that span channels. However, the fact that each physical channel 535a,b may process requests at differing rates (for reasons similar to those discussed above, such as garbage collection), there can still be limited out of order I/O completions. However, as mentioned above, this out of order processing does not result in data consistency errors or significant data consistency errors.

Returning now to FIGS. 4-5, at process 415, the SSD 210' processes the I/O requests out of order. By way of example, as described above, the command handler logic 530 may fetch I/O commands 545a-h from the command queues 525a-c in order, and place them into respective physical channel queues 540a,b in order, and each physical channel 535a,b will process their respective channel queues 540a,b at their own rate, possibly out of order.

At process 420, the SSD 210' may notify the Host 205' of the I/O command completions, in the same order in which the Host 205' issued the I/O commands. By way of example, the SSD 210' may comprise the notification manager logic 550. The notification manager logic 550 may comprise an I/O sequencer logic 551, a notification buffer 552, and a host notification logic 553. The notification buffer 552 may receive command completions notifications from the flash chips of the physical channels 535a,b for respective completed commands 545a-h. The I/O sequencer logic 551 may associate the completion notifications with the respective I/O commands 545a-h, and their associated sequence tags.

The I/O sequencer logic 551 may contain an indexing logic similar to indexing logic 533, except that it tracks commands that have been issued to the physical channel queues 540a,b, rather than the I/O command queues 525a-c (indexing logic not shown). In other embodiments, the I/O sequencer logic is in communications with index logic 533, which in some embodiments may track both the command queues 525a-c and the physical channel queues 540a,b. When the notification manager logic 550 receives a command completion notice from the physical channels 535a,b, the command completion notice is buffered in the notification buffer 552, and the I/O sequencer logic 551 associates the notification with a respective I/O command 545a-h and a sequence tag. The notification manager logic 550 may check the I/O sequencer 551 to see if a command completion notification pending in the notification buffer 552 is for the I/O command 545a-h having the lowest sequence tag. Based on finding that a command completion notification in the notification buffer 552 being associated with an I/O command having the lowest sequence tag, the notification manager logic 550 may invoke the host notification logic 553 to notify the Host 205' that the I/O command having the lowest sequence tag has been completed. In certain embodiments, the notification logic 553 may also notify the Host 205' of any subsequent I/O command completions in the notification buffer 552 having sequence tags immediately following/sequential to the I/O command having the lowest sequence tag. Upon the sending of a command completion notification to the Host 205', the command completion notice, and associated I/O command listing and sequence tag are removed from the notification buffer 552 and the I/O sequencer 551 (e.g., by clearing the items from the buffer and index structure). Thus, the command completion notifications sent to the Host 205' are returned in the same order as the original I/O commands were sent.

Returning now to FIGS. 4-5, at process 425, the Host 205' receives I/O command completion notifications in an order that corresponds to the order in which the original I/O commands 545a-h were sent to the SSD 210'. The Host 205' may then notify the various applications/OS 505 and/or user threads 510 of the I/O command completions. The Applications/OS 505 and user threads 510 thereby are informed of the success of their operations in proper order.

Upon examining FIGS. 4-5, it is apparent that, in some embodiments, the use of host resources are greatly reduced.

More specifically, I/O commands need not undergo extensive staging and de-staging, and associated completion tracking and ordering on the Host 205'. Furthermore, the individual I/O queues 520*a-c*, nor any given address ranges, need incur any form of locking to prevent or reduce consistency errors. Furthermore, the Host 205' need not operate any I/O distribution mechanism, such as the hash logic 315 of FIG. 3. Finally, processor cycles and memory otherwise devoted to these tasks may be freed for other uses.

Figure 6:
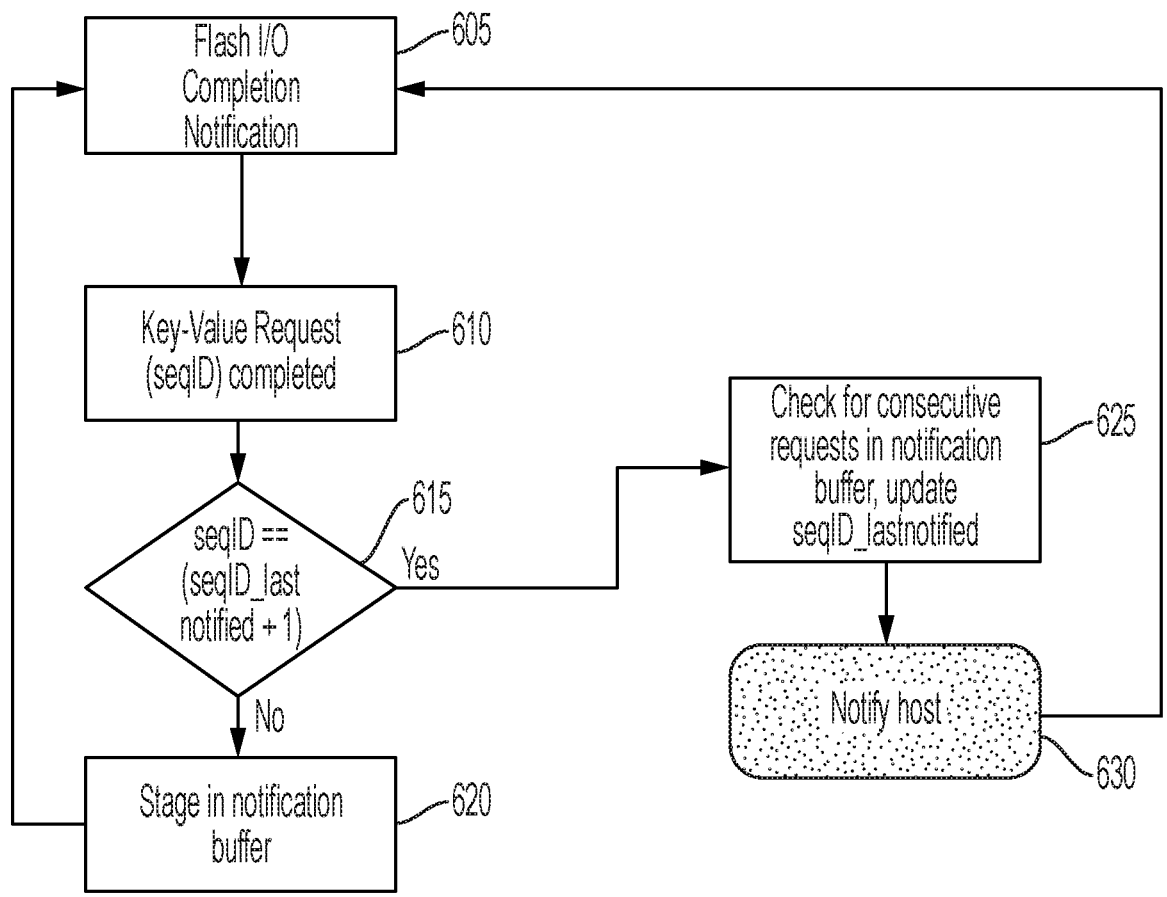
FIG. 6 is an example block diagram of a process for ensuring that a host is notified of completed I/O operations in order, according to an example embodiment of the present invention.

Turning now to FIGS. 5-6, FIG. 6 provides a flow chart for an embodiment of a process for the notification manager logic 550 of FIG. 5 to use when determining to issue command completion notices to the Host 205' of FIG. 5. At process 605, the notification manager logic 550 receives a subject I/O command completion notification from a flash chip residing on the physical channels (e.g., a flash channel) 535*a,b*, and stores it in the notification buffer 552.

At process 610, the subject I/O command completion notification is associated with a particular I/O command (e.g., a KV request) of the I/O commands 545*a-h*, and its associated sequence tag. This may be done by referencing the command completion notice with an index logic associated with the I/O sequencer 551 (e.g. an internal index, or index logic 533), as described above. In some embodiments, if an I/O command 545*a-h* has been distributed amongst multiple channels as described above, it is at this process that the individual channel completions are coalesced into a single "completion" for the I/O command.

At process 615, the sequence tag of the subject I/O command completion notice is checked to see if it is the lowest sequence tag of the currently pending I/O commands completion notices in the command sequencer's 551 associated indexer logic (e.g. an internal index, or index logic 533). In some embodiments, this may be done by comparing the sequence tag of the subject I/O command completion notice to a sequence tag number of that last-notified sequence tag. By way of example, in embodiments where the sequence tag is a sequential integer, the notification manager logic 550 may check to see if the sequence tag of the subject I/O command completion notice is one greater than ID of the most recent I/O command completion notice sent to the host-if it is, then the subject command is the lowest-tagged pending I/O completion command. In other embodiments, such as where the sequence tag is a timestamp, the notification manager logic 550 may utilize the indexing logic associated with I/O sequencer 551 (e.g. an internal index, or index logic 533) to determine if the subject I/O command completion notification is the lowest-tagged such notification. More specifically, for example, if the subject I/O command notification is at the root of a min-heap index, then it is the lowest-tagged notification.

At process 620, based on the subject I/O command completion notification not being the lowest tagged of the associated outstanding I/O commands, the notification may be staged in the notification buffer for future notification (e.g., when I/O command completions with earlier sequence tags are processed, as illustrated below), and the process returns to process 605 ready to receive more I/O command completion notifications.

At process 625, based on the subject I/O command completion notification being associated with the lowest outstanding command, the notification manager logic 550 may search through the notification buffer 552 to locate any buffered I/O command completion notifications that may be sequential to the subject I/O command completion notification. In some embodiments, this may be done by comparing the contents of the notification buffer 552 to the order provided in the index of the I/O sequencer logic 551. In some alternative embodiments, this may be done by checking the sequence tags of the buffer contents for numerical sequentiality to the subject I/O command completion notification. The subject I/O command completion notification and any sequential I/O command completion notifications so identified may be sent to the host notification logic 553, cleared from the notification buffer 552, and removed from an index associated with the I/O sequencer logic 551 (e.g. an internal index, or index logic 533), and the last sequence ID notified (of process 615) may be updated.

At process 630, the host notification logic 530 issues the subject I/O command completion notification and any sequential I/O command completion notifications identified in process 625 to the Host 205'. The processes of FIG. 6 may then begin anew as needed.

Figure 7:
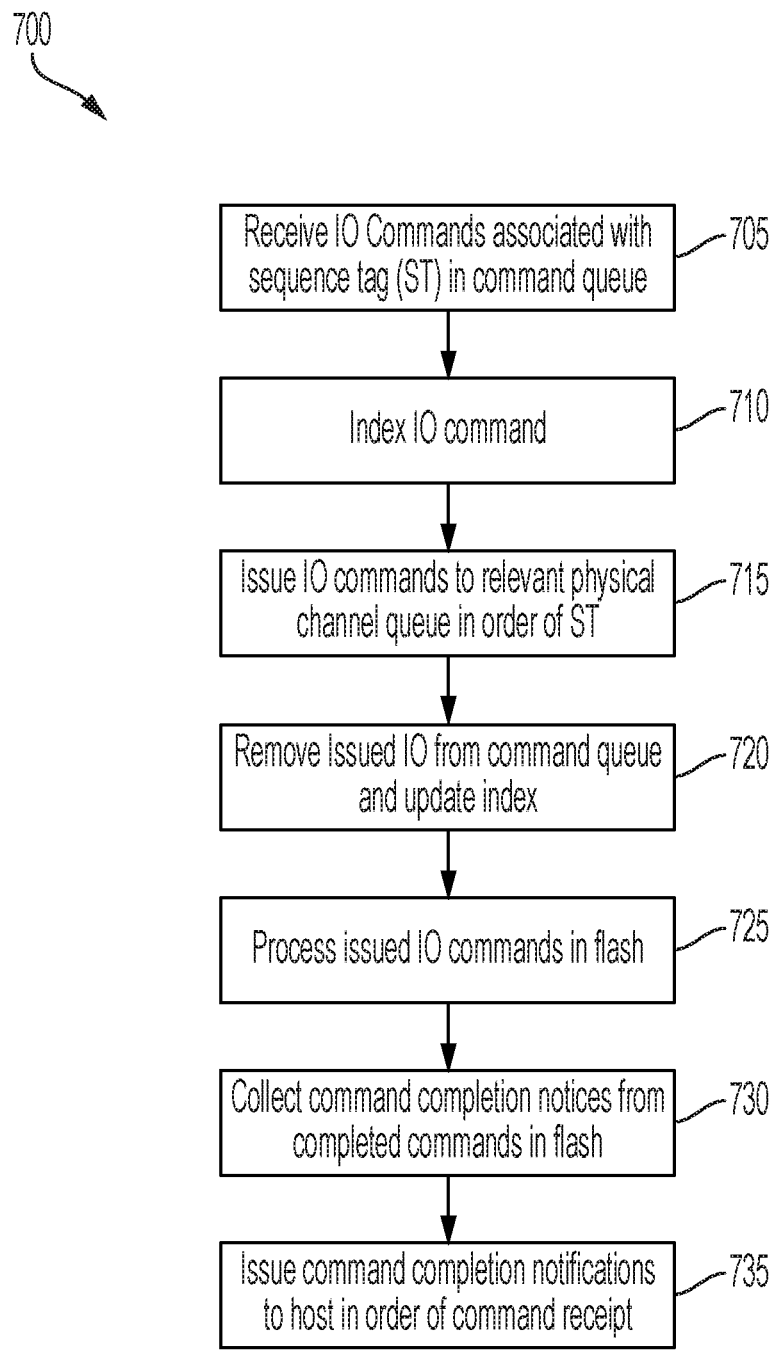
FIG. 7 is an example flow chart for a storage device to process I/O command completion notifications in order, according to an example embodiment of the present invention.

FIG. 7 presents a method for an SSD such as the SSD 210' to receive I/O commands in order from the Host 205', and to notify the Host 205' of completed I/O commands in that same order. One of ordinary skill in the art would recognize that the processes in FIG. 7 may be done in alternate orders, or that certain steps can be added or removed without departing from the concepts disclosed herein.

At process 705, I/O commands, associated with respective sequence tags may be placed in one or more command queue, such as the command queues 525*a-c* of FIG. 5, on the SSD 210'. The sequence tags may be associated with the I/O commands either at the Host 205' or at the SSD 210' by a sequence tag generator logic such as the sequence tag generator logic 546 of FIG. 5.

At process 710, the I/O commands may be indexed in an I/O command queue index, such as the indexing logic 533 of FIG. 5, whereby the index tracks the association of the I/O commands and the sequence tags, and orders the entries according to sequence tag sequnetiality.

At process 715, the I/O commands may be move from an I/O command queue to one or more physical channel queues, such as the channel queues 540*a,b* of FIG. 5, according to the sequential order of their sequence tags. The physical channel queue(s) may correspond to physical channels housing solid state memory chips containing the physical addresses which the I/O command corresponds to. By way of example, in some embodiments, this may be done by: determining the I/O command with the lowest sequence tag, determining one or more storage channels associated with an address of the I/O command determined to have the lowest sequence tag, and placing the determined I/O command into one or more storage channel queues for storage channels associated with the determined address of the I/O command. More specifically still, in some embodiments, the physical addresses may be derived from a key of a key-value pair. For example, in some embodiments, a key may be mapped to one or more physical addresses. In other embodiments, the physical addresses may be derived from one or more LBAs, for example, in some embodiments, the one or more LBAs may be mapped to one or more physical addresses.

At process 720, I/O commands that have been moved to a physical channel queue are removed from the I/O command queues, and the I/O command queue index is updated.

At process 725, the flash channel queues each process their respective I/O commands. When an I/O command is completed, a corresponding I/O command completion notification may be sent to a notification manager logic, such as the notification manager logic 550 of FIG. 5.

At process 730, I/O command completion notices are collected. They may be collected in a notification buffer such as the notification buffer 552 of the notification manager 550, of FIG. 5.

At process 735, I/O command completion notices are issued to the host in the same order in which the corresponding I/O commands were received. Process 735 may be accomplished through processes similar to those discussed above with respect to FIG. 6.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may comprise instructions that, when executed, cause a device to perform at least a portion of the method steps or processes. In some embodiments, the computer readable medium may be comprised in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

Embodiments of the inventive concept may extend to the following statements, without limitation:

Statement 1: A method for processing IO requests in order by a storage device, the method comprising:
receiving a first I/O command and a second I/O command, the first I/O command and the second I/O command being assigned a sequence tag,
issuing the first I/O command and the second I/O command to one or more storage channels based on their respective sequence tags,
collecting a command completion notice of the first I/O command or the second I/O command when the first I/O command or the second I/O command has been respectively completed; and
issuing a command completion notification to a host based on the sequence tag of the associated completed first I/O command or the second I/O command.

Statement 2: The method of statement 1, wherein the received first and second I/O commands are indexed according to their sequence tags.

Statement 3: The method of statement 1, wherein the issuing of the first I/O command and the second I/O command to one or more storage channels based on their respective sequence tags comprises:
determining the I/O command with the lowest sequence tag, determining one or more storage channels associated with an address of the I/O command determined to have the lowest sequence tag;
placing the determined I/O command with the lowest sequence tag into one or more storage channel queues for storage channels associated with the determined address of the I/O command with the lowest sequence tag; and
updating the index to remove the determined I/O command with the lowest sequence tag.

Statement 4: the method of statement 3, wherein the address is based on a key of a key-value pair.

Statement 5: the method of statement 3, wherein the address comprises a logical block address (LBA).

Statement 6: the method of statement 1, wherein the sequence tag is determined by the host.

Statement 7: the method of statement 1, wherein the sequence tag is determined by the storage device.

Statement 8, the method of statement 1, wherein the issuing of the command completion notification to the host comprises:
determining if the sequence tag associated with a first completed I/O command is the lowest sequence tag of all of the sequence tags associated with I/O commands awaiting processing; and
based on determining that a sequence tag of the completed I/O command is the sequence tag of the lowest outstanding I/O command, issuing to the host all command completion notifications for completed I/O commands having sequence tags that are sequential to the determined lowest sequence tag, including the lowest sequence tag.
based on determining that a sequence tag of the completed I/O command is not the sequence tag of the lowest outstanding I/O command, placing the command completion notice in a buffer.

Statement 9: A storage device comprising:
at least two command queues;
a command handler logic;
at least two physical channels, each physical channel being associated with one or more solid-state storage media, the respective storage media being associated with respective physical addresses;
at least two physical channel queues, associated with respective ones of the at least two storage channels; and
a notification manager logic,
wherein:
the at least two command queues are configured to receive I/O commands from a host, the I/O commands being associated with sequence tags;
the command handler logic is configured to issue I/O commands from the at least two command queues to the at least two physical channel queues, based on the physical addresses associated with the I/O commands and the sequence tags of the commands; and
the notification logic is configured to issue I/O command completion notices to the host based on the sequence tags of respective completed I/O commands.

Statement 10: the storage device of statement 9, further comprising a sequence tag generator logic, configured to be in communication with the command handler logic or the command queues, and to receive I/O commands from the command queues received from the host and associate them with a sequence tag determined by the order of receipt of the I/O commands.

Statement 11: the storage device of statement 10, further comprising an indexing logic and an index memory, wherein the indexing logic is configured be in communication with the sequence tag generator logic, the command handler logic, or the command queues, and to index, within the index memory, the I/O commands with their respective sequence tags.

Statement 12: The storage device of statement 11, wherein the command handler logic is configured to:
determine the I/O command with the lowest sequence tag in the index;
determine one or more storage channels associated with an address of the I/O command determined to have the lowest sequence tag;
place the determined I/O command into one or more of the storage channel queues associated with solid state storage media associated with the determined address of the I/O command; and
update the index to remove the determined I/O command with the lowest sequence tag.

Statement 13: the storage device of statement 12, wherein the I/O command comprises a key-value command, and the storage addresses are determined based on a key of the key-value command.

Statement 14: the storage device of statement 12, wherein the I/O command comprises one or more logical block addresses (LBAs), and the storage address is determined based on the LBAs.

Statement 15: The storage device of statement 9, wherein the notification logic comprises:
a notification buffer;
an I/O sequencer logic; and
a host notification logic,
wherein:
the notification buffer is configured to receive and store command completion notices for respective I/O commands that have been completed by the physical channels;
the I/O sequencer logic is configured to determine the sequence tag associated with the command completion notices received from the physical channels, and is further configured to determine if a command completion notice in the notification buffer has a sequence tag that is the lowest sequence tag that has not yet been notified to the host; and
the host notification logic is configured to notify the host, upon determining that the buffer contains a command completion notice corresponding to the lowest sequence tag that has yet to be notified to the host, that the associated I/O command is complete.

Statement 16: A system comprising:
a host computer system; and
a storage device communicatively coupled to the host computer system,
wherein the storage device comprises:
at least two command queues;
a command handler logic;
at least two storage channels, each channel associated with one or more solid-state storage media, the respective storage media being associated with respective storage addresses;
at least two storage channel queues, associated with respective ones of the at least two storage channels; and
a notification manager logic,
wherein:
the at least two command queues are configured to receive I/O commands from the host computer system, the I/O commands being associated with sequence tags;
the command handler logic is configured to issue I/O commands from the at least two command queues to the at least two storage channel queues, based on storage addresses associated with the I/O commands and the sequence tags of the commands; and
the notification logic is configured to issue command completion notices to the host based on the sequence tags of respective completed I/O commands.

Statement 17, The system of statement 16, wherein the host computer system comprises a sequence tag generator, and is configured to associate sequence tags with the I/O commands for transmission to the storage device.

Statement 18, the system of statement 17, wherein the sequence tag generator comprises logic configured to apply sequence tags to LBA requests according to the order in which applications running on the host require access.

We claim:

1. A method for processing IO requests in order by a storage device, the method comprising:
receiving, by the storage device, a first I/O command and a second I/O command in order from a host coupled to the storage device, the first I/O command and the second I/O command being assigned a sequence tag;
issuing, by the storage device, the first I/O command and the second I/O command to one or more storage channels based on their respective sequence tags using one or more physical channel queues comprising I/O commands ordered in sequence tag order;
collecting a command completion notice of the first I/O command or the second I/O command based on determining that the first I/O command or the second I/O command has been respectively completed; and
issuing a command completion notification to the host based on the sequence tag of the associated completed first I/O command or second I/O command.

2. The method of claim 1, wherein the received first and second I/O commands are indexed according to their sequence tags.

3. The method of claim 2, wherein the issuing of the first I/O command and the second I/O command to one or more storage channels based on their respective sequence tags comprises:
determining the I/O command with the lowest sequence tag;
determining one or more storage channels associated with an address of the I/O command determined to have the lowest sequence tag;
placing the determined I/O command with the lowest sequence tag into the one or more physical channel queues for storage channels associated with the determined address of the I/O command with the lowest sequence tag; and
updating the index to remove the determined I/O command with the lowest sequence tag.

4. The method of claim 3, wherein the address is based on a key of a key-value pair.

5. The method of claim 3, wherein the address comprises a logical block address (LBA).

6. The method of claim 1, wherein the sequence tag is determined by the host.

7. The method of claim 1, wherein the sequence tag is determined by the storage device.

8. The method of claim 1, wherein the issuing of the command completion notification to the host comprises:
determining if the sequence tag associated with a completed I/O command is the lowest sequence tag of all of the sequence tags associated with I/O commands awaiting processing;
based on determining that the sequence tag of the completed I/O command is the sequence tag of the lowest outstanding I/O command, issuing to the host all command completion notifications for completed I/O commands having sequence tags that are sequential to the determined lowest sequence tag, including the completed I/O command having the lowest sequence tag; and
based on determining that the sequence tag of the completed I/O command is not the sequence tag of the lowest outstanding I/O command, placing the command completion notice in a buffer.

9. A storage device comprising:
at least two command queues;
a command handler logic;
at least two physical channels, each physical channel being associated with one or more solid-state storage media, the respective storage media being associated with respective physical addresses;
at least two physical channel queues, associated with respective ones of the at least two physical channels; and
a notification manager logic,
wherein:
the at least two command queues of the storage device are configured to receive I/O commands in order from a host coupled to the storage device, the I/O commands being associated with sequence tags;
the command handler logic of the storage device is configured to issue I/O commands from the at least two command queues to the at least two physical channel queues, based on the physical addresses associated with the I/O commands and the sequence tags of the commands, the at least two physical channel queues comprising I/O commands ordered in sequence tag order; and
the notification manager logic is configured to issue I/O command completion notices to the host based on the sequence tags of respective completed I/O commands.

10. The storage device of claim 9, further comprising a sequence tag generator logic, configured to be in communication with the command handler logic or the command queues, and to receive I/O commands from the command queues received from the host and associate them with a sequence tag determined by an order of receipt of the I/O commands.

11. The storage device of claim 10, further comprising an index logic and an index memory, wherein the index logic is configured be in communication with the sequence tag generator logic, the command handler logic, or the command queues, and to index, within the index memory, the I/O commands with their respective sequence tags.

12. The storage device of claim 11, wherein the command handler logic is configured to:
determine the I/O command with the lowest sequence tag in the index;
determine one or more storage channels associated with an address of the I/O command determined to have the lowest sequence tag;
place the determined I/O command into one or more of the physical channel queues associated with solid-state storage media associated with the determined address of the I/O command; and
update the index to remove the determined I/O command with the lowest sequence tag.

13. The storage device of claim 12, wherein the I/O command comprises a key-value command, and storage addresses are determined based on a key of the key-value command.

14. The storage device of claim 12, wherein the I/O command comprises one or more logical block addresses (LBAs), and a storage address is determined based on the LBAs.

15. The storage device of claim 9, wherein the notification manager logic comprises:
a notification buffer;
an I/O sequencer logic; and
a host notification logic,
wherein:
the notification buffer is configured to receive and store command completion notices for respective I/O commands that have been completed by the physical channels;
the I/O sequencer logic is configured to determine the sequence tag associated with the command completion notices received from the physical channels, and is further configured to determine if a command completion notice in the notification buffer has a sequence tag that is the lowest sequence tag that has not yet been notified to the host; and
the host notification logic is configured to notify the host, upon determining that the buffer contains a command completion notice corresponding to the lowest sequence tag that has yet to be notified to the host, that the associated I/O command is complete.

16. A system comprising:
a host computer system; and
a storage device communicatively coupled to the host computer system,
wherein the storage device comprises:
at least two command queues;
a command handler logic;
at least two storage channels, each channel associated with one or more solid-state storage media, the respective storage media being associated with respective storage addresses;
at least two physical channel queues, associated with respective ones of the at least two storage channels; and
a notification manager logic,
wherein:
the at least two command queues of the storage device are configured to receive I/O commands in order from the host computer system, the I/O commands being associated with sequence tags;
the command handler logic of the storage device is configured to issue I/O commands from the at least two command queues to the at least two physical channel queues, based on storage addresses associated with the I/O commands and the sequence tags of the commands, the at least two physical channel queues comprising I/O commands ordered in sequence tag order; and the notification logic is configured to issue command completion notices to the host based on the sequence tags of respective completed I/O commands.

17. The system of claim 16, wherein the host computer system comprises a sequence tag generator, and is configured to associate sequence tags with the I/O commands for transmission to the storage device.

18. The system of claim 17, wherein the sequence tag generator comprises logic configured to apply sequence tags to LBA requests according to the order in which applications running on the host require access.

* * * * *